Sept. 27, 1960  N. P. TOTAH ET AL  2,954,246
METHODS AND MEANS FOR FORMING HIGH-STRENGTH JOINTS
Filed June 29, 1956

INVENTORS.
NADIM P. TOTAH
FRANCIS M. FULTON
BY
ATTORNEYS.

United States Patent Office 2,954,246
Patented Sept. 27, 1960

2,954,246

METHODS AND MEANS FOR FORMING HIGH-STRENGTH JOINTS

Nadim P. Totah and Francis M. Fulton, China Lake, Calif., assignors to the United States of America as represented by the Secretary of the Navy Filed June 29, 1956, Ser. No. 595,023

1 Claim. (Cl. 285—330)

(Granted under Title 35, U.S. Code (1952), sec. 266)

The invention described herein may be manufactured and used by or for the Government of the United States of America for governmental purposes without the payment of any royalties thereon or therefor.

This invention relates to improvements in tube couplings, and more specifically to methods for simply and economically forming joints of great strength between thin-walled tubing and thick-walled or solid internal end closure or collar pieces, and to the joints formed by such methods.

There are many known expedients whereby tubular cylindrical members may be attached to one another or to closure or bushing members. The nature of such joints is of great variety and in any one application the type of joint which must be used is determined by the strength and tightness required in the particular usage. Thus, in the design and fabrication of devices involving members subject to high internal pressures and to high stresses tending to cause longitudinal separation or relative rotation of the parts, the joints must be of great strength and tightness. As an example, the joints used in connecting the motor tubes of rocket motors to the head and end closures thereof are subject to extremely high stresses due to pressure and temperature conditions and due to forces tending to cause relative longitudinal and rotational movement of the parts. In joints such as these, where the weight of materials is also critical the cylindrical tubing must be as thin as possible, which further complicates joint design, since the joint must be made in such a way as not to critcally weaken the tubing.

Prior to the instant invention such joints were effected in several ways, all involving machining of the various parts to very close tolerances. Thus, for example, it is common to machine conventional screw threads on the parts to be joined to effect a connection. This method of forming a joint is subject to several disadvantages, especially in connection with the use of thin-walled tubing. The threading of thin-walled tubing is difficult and costly because thin-walled tubing diameters are almost invariably out-of-round, causing threads to be cut deeper in some places than in others, with resulting weakness of the tube wall structure. Therefore, close tolerances are necessary and the threading operation results in a high percentage of rejects and is costly. Moreover, when sealing rings are utilized in such joints, the screwing together of the parts in assembly subjects such rings to transverse forces tending to make them leak at low pressures. A final disadvantage of threaded joints is, of course, the tendency to loosen during handling, storage, and use.

Another prior art method involves the use of lock wires forced into and around adjacent slots in the two pieces to be joined and this coupling method requires extensive pre-assembly machining of both of the pieces to be joined, as well as of the lock wires. For high-pressure joints involving thin-walled tubings this arrangement requires close tolerances and this fact, coupled with the many machining operations which are necessary makes the lock-wire almost prohibitively expensive.

The present invention is based upon the discovery that strong joints can be efficiently and economically effected by techniques involving the pre-assembly machining of only the thicker end closure or internal collar member, and not involving the use of any parts in the joint other than the pieces to be joined. It has been discovered that thin-walled tubing may be joined to internal end closure or bushing members without pre-joining machining or shaping of such tubing, by crimping the tubing, after assembly, to shear tabs therefrom which extend into previously prepared recesses in the internal member, and that such joints may be of a strength in the order of the radial bursting strength of the tubing if the recesses and the sheared tabs are of configurations of the general nature specifically described in the ensuing description, and if they are placed in a portion of the tubing which is sealed off from the internal pressure to which the tube may be subjected.

Accordingly, it is an object of this invention to provide new and improved joint structures in which thin-walled tubular members have partially sheared tabs crimped into recesses in an internally positioned member to form joints capable of withstanding high stresses.

Another object of the present invention is to provide simply constructed high strength joints for thin-walled metallic tubing which are more easily and economically effected than previously known joints of equivalent strength and do not require the close machining tolerances of such previously known joints.

Other objects and many of the attendant advantages of this invention will be readily appreciated as the same become better understood by reference to the following detailed description when considered in connection with the accompanying drawing, wherein.

Figure 1:
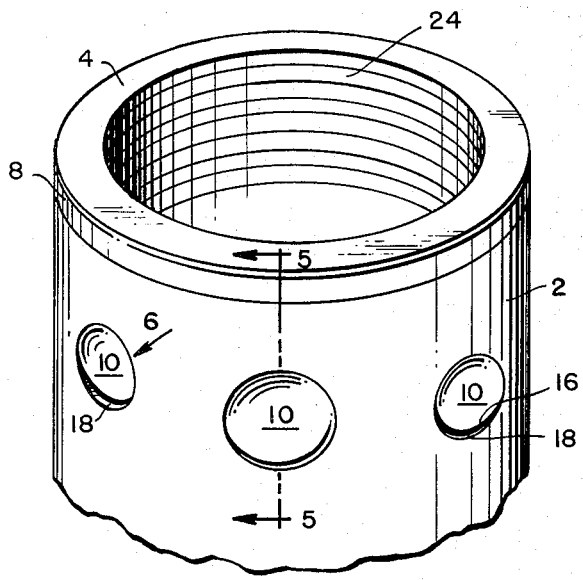
Fig. 1 is a perspective view of a joint according to the present invention showing an end portion of a thin-walled tubular member joined to an internally threaded collar or bushing which extends internally into the tubular member, the parts representing this illustrative example being a rocket motor tube and a head closure sleeve for a rocket motor.
Figure 5:
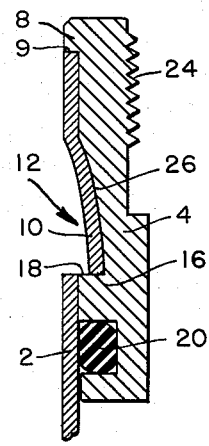
Figure 2:
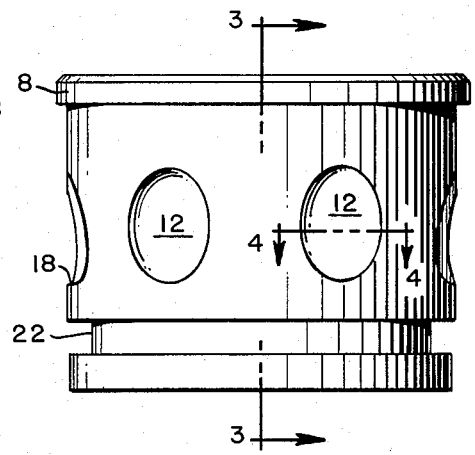
Fig. 2 is an elevational view of the collar member, which comprises the internal member of the joint.
Figure 4:
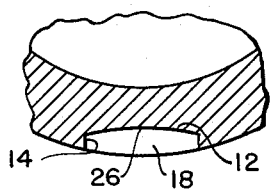

Fig. 4 is a fragmentary sectional view, taken along the line 4—4 of Fig. 2, in the direction of the arrows, to show the nature of the recesses or slots in the collar members; and Fig. 5 is an enlarged fragmentary sectional view taken along the line 5—5 of Fig. 1, showing the assembled relationship of a sheared and crimped tab on the tubular member with a depression in the collar member in effecting a joint between said members.

Attention is now directed to the drawing wherein like reference numerals have been appended to like parts throughout. The present invention obviously involves a joint of general application but the specific illustrative example shown in the drawing is of the joint as used in connecting the thin-walled tubing of a rocket motor to a rocket motor head closure sleeve. Thus, Fig. 1 shows the completed joint between one end of a rocket motor tube 2 and a flanged sleeve member 4, the tube end abutting the flange 8 of the sleeve member as at 9 (Fig. 5), and the pieces being tightly joined together by means of the crimped tab connections designated by the reference numeral 6. In such a joint therefore, the pieces are restrained from relative rotational motion by virtue of the abutment of the sides of the tabs 10 on the side walls 14 of the prepared retainer slots 12 in the inner members (such side walls being shown best at 14 in Fig. 4) and they are restrained from relative longitudinal movement by abutment of the tube end with the flange 8 (as at 9) and by abutment of the free edges 16 of the tabs 10 with ledges 18 formed by the deepest portions of retainer slots 12. Such joints are extremely simple, and economical by virtue of the fact that the method of assembly (to be later described) does not involve any preassembly machining of the thin-walled tubing other than that normally present in the mere production of the tubing.

The above description sets forth the structure of joints according to the present invention and the general method of assembly of such joints in broad terms. Obviously, there are many variations possible, as for example, the number and size of the tabs to be used; the size, shape and depth of the retainer slots; the degree of shearing of the tube wall in the formation of the tabs; the distance of the retainer slots from the flange; and the permissible tolerance between the pieces to be joined. Thus, for any particular application these considerations may be varied, depending on the materials to be used and the use to which the joint is to be put. If such a joint were to be used in a low pressure or low stress situation, or in a situation where no internal pressure is involved, none of the aforementioned considerations would be critical in using the present method, and variations could be made at will.

In usages wherein it is necessary that the joint be capable of withstanding high internal pressures, in the form of hoop stresses as well as high longitudinal stresses tending to separate the joint, every factor previously mentioned must be carefully considered, and, in fact a new critical factor is introduced when such stresses are of an order capable of breaking the joint or of bursting the tube. This added factor results from the fact that all surfaces of an internally stressed tubular body are equally stressed by "hoop" stresses. It follows therefore that weakening of the walls of a tubular member by the formation of crimped tabs therein would materially weaken the tube wall at the tab area so that failure would occur in this area well below the normal bursting strength, and, of course, pressure fluid would be lost in the absence of appropriate sealing means. An important facet of the present invention, as applied to high-strength joints resides in the discovery that the inclusion of suitable sealing means, as a sealing ring 20, in appropriate retaining groove means 22 in the inner or collar member, to seal off the area in which the retaining slots 12 and crimped tabs 10 are formed, serves to isolate this portion of the tubular wall from the hoop stresses so that the said portion of the tube wall is subject only to the longitudinal stresses mechanically placed thereon by fluid pressure acting upon any closure or transverse wall means attached to the collar member, as by threading into the threads 24 of such a collar member.

In a rocket motor tube, the hoop stress is twice the longitudinal stress. Thus, in a portion of the tube sealed from direct motor (propellant gas) pressure but still carrying the longitudinal stress load of such pressure against end closure means, half of the circumference of the tube can be cut away transversely without subjecting the tube to a stress that will cause it to fail below its normal hoop failure pressure. This fact controlled the design of one particular crimped-tab connection, in which seven tabs transversely sheared through something less than half the circumference of the tubular member are crimped into recesses in the end closure member. In the illustrative example, specific applications of some of the possible variants mentioned above are shown and will be described in detail.

Figure 3:
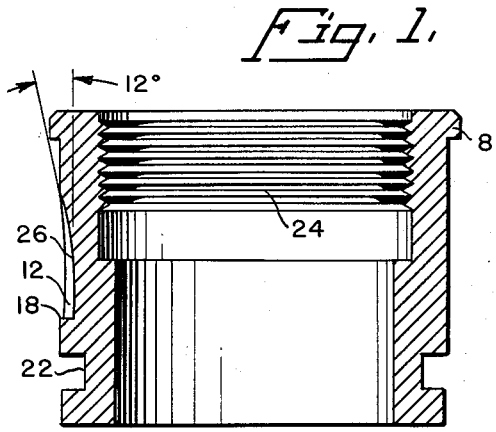
Fig. 3 is a vertical sectional view of the collar member of Fig. 2, taken along the line 3—3 of that figure.

The recesses for the tabs may be of substantially elongated circular (elliptical) configuration as best seen in Figs. 2 and 3. Considering the recesses as ellipses the major axes thereof are disposed longitudinally of the collar member and are of gradually increasing depth from the edge nearest flange 8 to the opposite deepest ends 18 of the recesses. Such recesses may be machined with an end mill that has the cutting edge ground to a radius. Such a mill generates a concave spherical surface as it is fed into the work and this surface is elongated to a generally elliptical shape by running the end mill parallel to the longitudinal axis of the tube. The radius of the cut for the recesses and the maximum depth thereof should be so chosen that slightly less than half of the tubular wall is sheared in crimping tabs therefrom to fill the recesses. Thus, for two-inch outer diameter tubing the maximum width of each of the recesses or slots should be 0.450 in. wide; 0.480 in. long; 0.070 in. deep at the lowest point 18; 1.0 in. in concave radius (of the back surface 26 of the recess as best shown in Fig. 4); and 12 degrees in angle (see Fig. 3) with respect to the longitudinal axis of the tubing at the shallow end of the recess. It is repeated that both the shape and exact dimensions as well as the number of retaining slots (recesses) may be varied, the above specific example representing one possible design which is advantageous because of strength and ease of fabrication.

An added feature of strength for joints made in accordance with the present invention is effected by virtue of the concavity of the back wall 26, as best seen in Fig. 5. By virtue of this concavity, when the tube wall material is crimped into the recess in contact with the wall 26, it is supported against further bending and hence resists loosening from the recess when subjected to longitudinal compression.

The joint of this invention is formed by taking a sleeve or collar member 4, as described above, having a flange 8, recesses 12, as described above, and an inner groove 22, as shown in Figs. 3 and 4, and placing a sealing member, which may be in the form of an O ring 20 into the groove 22. Then the collar member is inserted into one end of the tubular member 2 until the end of the tube abuts the flange 8. Crimping pressure is then applied externally of the tube wall to cause the wall to shear and to form the partially connected and partially sheared tabs 10 as shown in Figs. 1 and 5, the tabs shearing from the tube wall at the places where the retainer slots are deepest, the free edges 16 being pressed into the recesses to bear against the ends 18 of the recesses to resist longitudinal separation of the joint. The crimping pressure may be applied in any suitable manner, one preferred method being the application of hydraulic pressure to a rubber crimping ring which is confined in a supporting die and which is positioned around the area containing the recesses. The particular machine for performing this operation is not the subject matter of this invention and will not be disclosed in detail. Joints formed in accordance with the teachings of the present invention have a strength in the order of the bursting strength of the tubular members to which they are applied and may be formed at comparatively low crimping pressures (in the order of 11,000 p.s.i. for thin-walled aluminum tubing). It has been found that the strength of the joints is not adversely affected by reasonable tolerances in the width, length and depth of the retainer slots or recesses 12 and, for the two-inch tubing used as an example, diametrical clearance between the inner diameter of the tube 2 and the outer diameter of sleeve or collar member 4 may vary between 0.002 and 0.018 in. without appreciably affecting either the crimping pressure necessary to form the joint or the strength thereof. Similarly, it has been found that variations in the angular spacings as large as 2 degrees between tabs does not decrease the failure pressure, and that minor marring of the surfaces of the collar member and of the recesses therein prior to assembly due to rough handling do not adversely affect the final joint.

From the above, it may be seen that the above described invention provides methods and means for simply and economically joining thin-walled tubing to internally positioned end closures or collar members and that such joints may be arranged to have strengths in the order of the bursting strength of the tubing. Such connections can obviously be adapted to thin-walled tubing when other connections, such as threads, lock-wires, snap-rings, or welding are impractical.

Changes in the size, shape and number of tabs, as stated hereinabove, can be determined to adapt such connections to tubings of differing wall thicknesses and diameter and of different materials, the shear strength and the physical properties of the tubing determining the size and shape of the retaining slots and tabs to meet the crimp pressure requirements and the strength requirements of the connection. Thus, many modifications and variations of the present invention are possible in the light of the above teachings. It is therefore to be understood that the scope of the invention is to be considered as restricted only by the scope and limitations of the appended claim.

What is claimed is:

A pressurized vessel comprising; a relatively thin wall cylindrical metal tube adapted to be internally pressurized, relatively rigid member having a cylindrical outer surface, and inner and outer ends, telescopically disposed within an end of said tube, an annular outwardy open groove in said member spaced from the inner end thereof, a fluid seal device such as an O-ring disposed within said groove engaging the inner surface of said tube adapted to prevent leakage of pressure from said tube, a plurality of angularly spaced outwardly open recesses in the outer surface of said member disposed between said groove and the outer end of said member, each recess being inwardly concave and having a surface forming a generally semi-circular abutment adjacent the end thereof most closely adjacent said groove, the surface of each abutment at all points thereof being at an angle generally normal to the surface of said member, a plurality of integral tabs formed from said tube, each having a portion thereof sheared from the wall of said tube providing a generally semi-circular portion in abutting relation with one of said abutments, the remaining portion of each tab being concave inwardly and abutting the remaining portion of a recess to provide a portion on the tabs adapted to be stressed in compression and supported from buckling by the concave portion of a recess, the diametrical cross sectional areas of all of said tabs being substantially equal to the cross sectional areas of the tube between the tabs, whereby the last named areas are subjected to substantially the same stress in tension per unit of cross section as the tube is subjected to circumferential tension per unit of cross section at portions thereof subjected to internal pressure.

References Cited in the file of this patent
UNITED STATES PATENTS

| | | |
|---|---|---|
| 599,492 | Carter | Feb. 22, 1898 |
| 1,190,803 | Rosenfeld | July 11, 1916 |
| 1,223,591 | Layne | Apr. 24, 1917 |
| 1,291,388 | Bright et al. | Jan. 14, 1919 |
| 1,329,479 | Savon | Feb. 3, 1920 |
| 1,516,762 | Decker | Nov. 25, 1924 |
| 1,797,691 | Merrill | Mar. 24, 1931 |
| 2,240,330 | Flagg et al. | Apr. 29, 1941 |
| 2,266,610 | Martin | Dec. 16, 1941 |
| 2,433,240 | Schlage | Dec. 23, 1947 |
| 2,436,407 | Stephens | Feb. 24, 1948 |
| 2,693,757 | Brandt | Nov. 9, 1954 |
| 2,776,151 | Harkenrider | Jan. 1, 1957 |

FOREIGN PATENTS

| | | |
|---|---|---|
| 68,413 | Denmark | Jan. 3, 1949 |